June 2, 1970 — J. PAKSY — 3,514,893
RESILIENTLY COUPLED ABUTTING MEMBERS DISPOSABLE IN PLURAL STABLE CONFIGURATIONS
Filed April 27, 1967 — 2 Sheets-Sheet 1
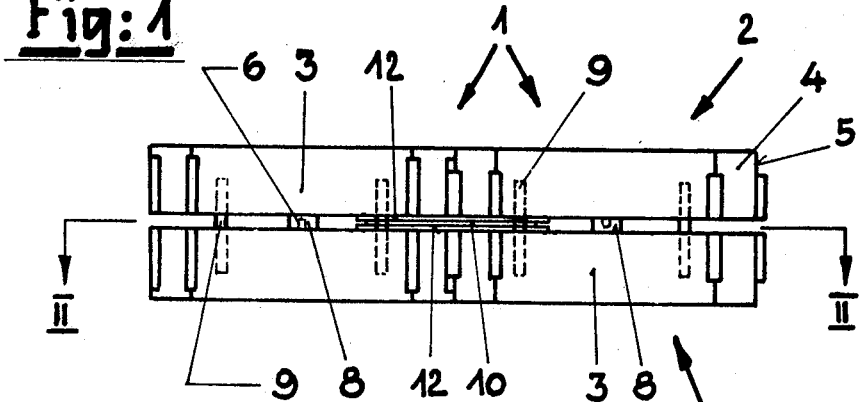
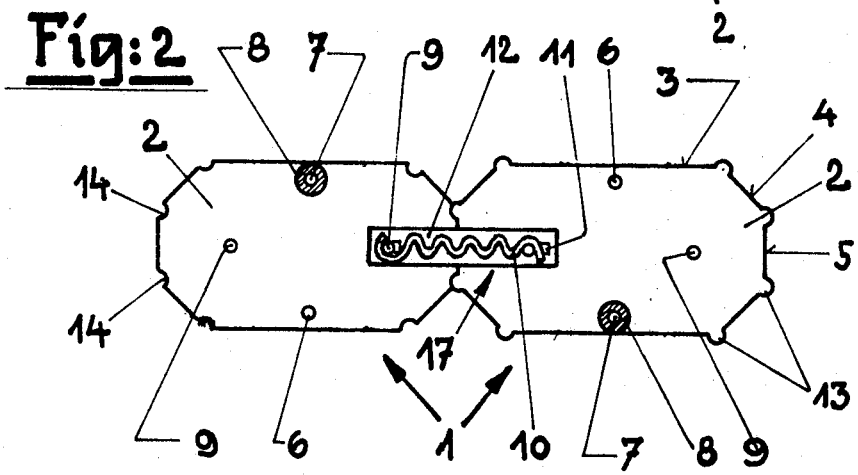
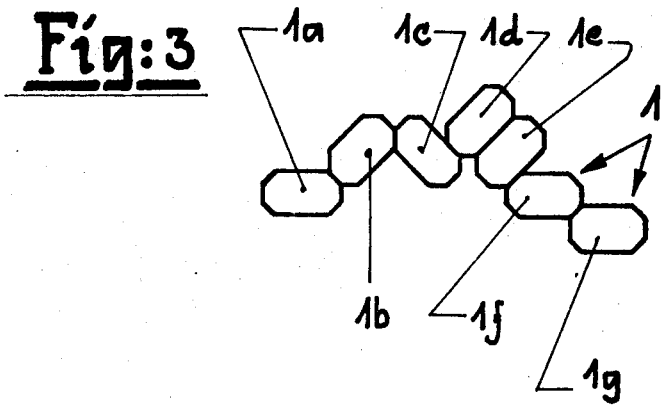

United States Patent Office 3,514,893
Patented June 2, 1970

3,514,893
RESILIENTLY COUPLED ABUTTING MEMBERS DISPOSABLE IN PLURAL STABLE CONFIGURATIONS
Jeno Paksy, Budapest, Hungary, assignor to Frankenplastik Vertriebs GmbH & Co. KG, Furth, Bavaria, Germany, a German company
Filed Apr. 27, 1967, Ser. No. 634,291
Claims priority, application Germany, Sept. 28, 1966, F 50,302
Int. Cl. A63h 33/00
U.S. Cl. 46—1                                    2 Claims

ABSTRACT OF THE DISCLOSURE

A plaything in the form of a chain, the links of which are polygonal and held together at any one of their sides by resilient, frictional resistance which can be overcome by appropriate force so as to permit a large number of different combinations of relative positions of the links.

---

The invention relates to a chain-like plaything including a number of mutually-connected members which are movable with respect to one another upon overcoming a resistance.

The plaything can be formed as an open or closed chain and permits the most diverse positions of the individual members so that a user can construct therewith the outline of the most diverse figures, such as, for example, of houses or animals. Since the figures formed with the plaything are stable, the members are not movable at will easily, but only by overcoming a certain resistance.

The invention aims, with a single means, both at joining two members and also providing the resistance ensuring the stability against any movement of these members. The invention also aims at providing a plaything in which two members can be pivoted with respect to one another about more than one axis so that, for example, two adjoining members can be arranged parallel to one another. The invention aims at providing a plaything which, with a small expenditure for the joining of two members, permits more basic variations of positions of these members with respect to one another.

The invention further aims at improving the construction of the coupling-part joining two members and the joining of the coupling-part with both its members. It aims also at joining the two half-members in each case into one member and at simplifying the assembly of the plaything. The invention aims at providing members consisting of symmetrical half-members and forming the plaything in such a way that its members can be moved with respect to one another as frequently as desired, without relaxing the strength of the resistance to be overcome.

The plaything according to the invention is characterized in that two neighbouring members, tapering towards their ends, are resiliently pressed against one another end to end by means of coupling-parts connected movably with respect to both members.

If two such members, which touch one another areally on flat surfaces, are moved relative to one another, the areal contact of this position is lost and the resilience of the resilient parts rises. In order to move the members with respect to one another, the resistance thus produced by the rising resilience must be overcome. In the playthings according to the invention, each of two neighbouring members can carry out a pivoting movement about a notional axis lying in the other member; both members, as in intermeshing gear-wheels, can roll on one another and the two members can be displaced parallel to one another in the plane given by the two notional pivotal axes.

A preferred form of the resilient connection of two members consists in the fact that the movable coupling-parts are formed so as to act as tension springs, and the two ends of which are each connected with one member. It is, however, also conceivable to use as a movable coupling-part a rigid pivoted lever, which is pivotable at both ends on pivot-pins which, for their part, are mounted in resilient mountings, e.g. of rubber, in both members. In all cases it is convenient and advantageous if two members are connected resiliently and pressed to one another by only one movable coupling-part and if the joining position of the movable coupling-part to a member has the same distance from all flat contact surfaces at that end of the member. In this formation the expenditure for joining two members is, on the one hand, very slight and on the other, the stability of each set position equally great. In order to increase the stability, it is convenient if, of two neighbouring members, one has prominences at the abutting edges of the contact surfaces and the other depressions, with the depth of the depressing being less than the height of the prominences.

The presently preferred embodiment of the invention is further characterized in that the section of the coupling-part acting as a tension spring, consisting of resilient material, is a stiff, resilient ring. The ring acts as a spring element. If the ring is loaded as a spring element, it loses its shape. If the ring is circular when under load, it is deformed to an ellipsoid shape. The deformation of the ring by traction on the two members coupled therethrough is elastic and returns on release of the tension. The ring as a spring element becomes fatigued in its spring-power less quickly than a helical spring.

The ring can advantageously engage a transversely strong abutment or pivot. For this purpose, it is provided that the two half-members of a member carry sleeves touching one another with their front faces, and into which a joining plug-pin is pressed. The ring, which encloses the plug-pins joining the two half-members, also includes the sleeve, large in cross-section as compared with the plug-pin. A large diameter of the ring increases its spring-power. In order, with increasing ring-diameter, not to have to arrange the sleeves further towards the middle of the member, there is provided on the ring, projecting into the interior thereof, a support projection which bears against the plug-pin.

The invention will now be described with reference to the accompanying drawings, which show an embodiment of the invention but in no restrictive sense.

FIG. 1 is a side view of two members joined to one another;

FIG. 2 is a view taken along line II—II of FIG. 1, the view looking in the direction of the arrows;

FIG. 3 is a diagrammatic view illustrating seven members in various positions in relation to one another;

Figure 4:
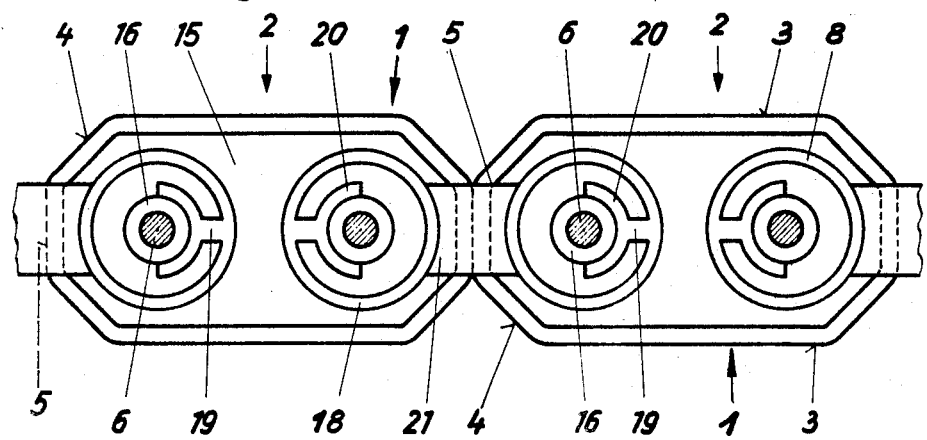
FIG. 4 is a plan view of a coupling section of a preferred embodiment.

In the embodiment according to FIGS. 1 and 2, each of the members 1 consists of two spaced-hollow half-members 2 which are arranged at a distance from one another. The members 1 have an oblong octagonal shape, flat lateral surfaces 3 and two ends tapering through flat oblique surfaces 4 to flat end surfaces 5. The lateral, oblique and end surfaces are, in the various positions of the two members 1, contact surfaces to one another. The half-members 2 are joined by means of plug-connection, for which purpose, each half-member has plug-pins 6 and plug-holes 7. The plug-holes 7 are in appendages 8 determining the distance apart of the half-members 2. The spaced half-members 2 define a slit 26 which intersects the surfaces 3, 4 and 5.

Likewise, for joining the two half-members 2, there co-operate, inserted in the half-members, pins 9 which serve as pivot abutment for a helical coupling spring 10 acting as a tension spring and project through oblong holes 11 of two guide-strips 12 which hold the helical spring 10 there between. In order to keep the distance between the two half-members 2 small, the helical spring 10 is wound as an open spiral. The helical spring 10 is movable with respect to both members 1 and presses the members against one another. Since the pins 9 have the same distance from all contact surfaces 3, 4, 5, at their respective ends of the members 1, the expansion of the spring 10 in each stable position of the two members with respect to one another is the same. The helical spring 10 and the two guide-strips 12 provide the coupling-part 17 between two members 1 which is received in the slit 26. In each stable position, the coupling-part 17 is perpendicular to the contacting surfaces.

In the members 1, which are preferably of plastic, the contact surfaces 3, 4 and 5 are preferably plane surfaces. At the abutting edges between the surfaces 3, 4 and 5 are, on one member 2, prominences 13, and on the other, depressions 14 having a depth slightly less than the height of the prominences. It is not essential that one member have only depressions and the other only prominences. Each member can have both depressions and prominences. Similarly, the contact surfaces do not have to be plane. They can also be, for example, convex or concave or some other proper shape. To make the surfaces plane is of advantage with respect to manufacture since then all members can be provided with similar surfaces.

FIG. 3 shows seven members 1a to 1g, with each adjoining pair having different relative positions. In the given form of the surface of the members, which at each end possess five plane contact surfaces, two lateral and oblique surfaces and the end surface each, two adjoining members 25 can assume various positions with respect to one another. By increasing the number of contact surfaces, more possibilities of variation are provided.

Figure 5:
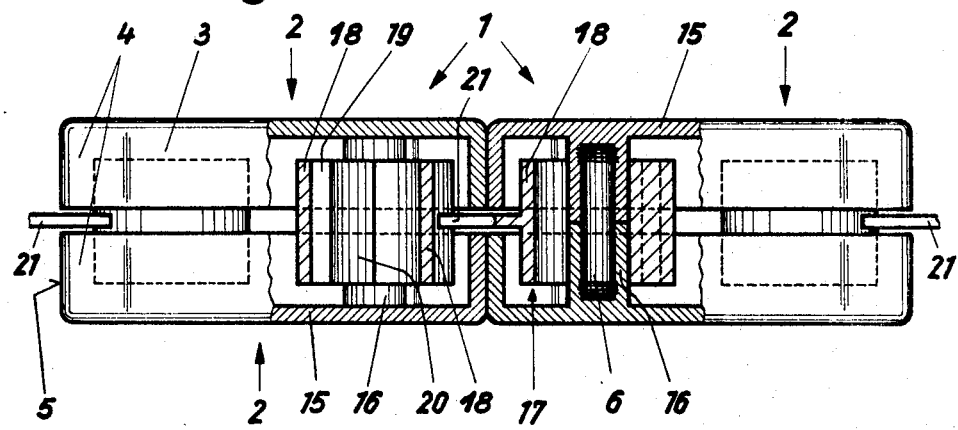
FIG. 5 is a side view of two members, with openings, partly in elevation and partly in section of a preferred embodiment.

In the preferred embodiment according to FIGS. 4 and 5, each member is likewise oblong and possesses as outer surfaces two lateral surfaces 3 parallel to one another which, at both ends, pass into two oblique surfaces 4 extending obliquely into one another, and which are connected through an end surface 5 running at right-angles to the lateral surfaces. Each member consists of two half-members 2 connected together, and is coupled by at least one further member. Each half-member is hollow like a box and presents its hollow to the hollow of the other half-member. Between the front surfaces of the walls of the two hollow half-members 2 of one member 1 there is a slit 26. Each half-member possesses inside, on its bottom surfaces 15, extending at right-angles to the preferred plane surfaces 5, oblique surfaces 4 and lateral surfaces 3, two sleeves 16 integral with the same, the axis of which extends parallel to the lateral, oblique and end surfaces and in each case has the same distance from these surfaces to the end of the member. The end surfaces of the sleeves are in contact so that the sleeves determine the distance of the bottom surfaces 15 of the two half-members 2 of a member 4. A plug-pin 6 is inserted with both its halves in each case into the plug-hole of a sleeve 16 of a half-member. The plug-pin 6 is provided with a screw-threaded and is force pressed into the plug-hole and therefore can hardly be again released. The sleeve 16 is a soft plastic and the plug-pin 6 of a metal.

A coupling-part 17 for coupling two members 1 possesses two circular rings of an elastically flexible, stiffly bendable substance, namely a synthetic plastic. Each ring 18 encloses at a distance two sleeves 16 connected by means of a plug-pin 6 and constituting a pivot for the coupling-part 17. Each ring carries integrally, turned towards the inside of the member, a support-bar 19 which projects into the inside of the ring. On its end, each support-bar carries integrally a support-trough 20 which fits onto the two sleeves 16 joined by a plug-pin 6 and half-encloses the same. The two rings 18 of each coupling-part 17 are rigidly connected by means of a coupling-bar 21 which opens into each ring from the outside, on the side opposite to the support-bar 19. The coupling bar 21 proceeds from a ring 18, passes from the member 1 thereof through the slit between the two half-members 2, enters likewise into the neighbouring member and there terminates in a second ring.

The plaything has the substantial advantage that it is to be manufactured from plastic apart from the plug-pins, and is therefore hygienic. Destructive oxidation of metal parts can therefore not arise. The plaything has also a long life because, without any lubrication, practically no wear takes place on the individual parts. As plastics in the plaything are used for example: for the half-members, low-pressure polyethylene and for the coupling-parts, acetate resin.

In the plaything, a coupling-part passes through those surfaces with which two members touch. Because the point of passage is present in all surfaces considered suitable for contact, they, and consequently the section of the coupling-part proceeding from one member, must have a small cross-section. This is possible in the present invention because the ring is to be arranged completely in the member.

The assembly of the plaything according to the invention is simple. Two half-members are placed alongside one another in surface contact. A coupling-part is pushed with its ring over a sleeve of a half-member. The ring pushed over is only slightly deformed with respect to its circular shape. Then, on the sleeves of the first half-member, plug-pins with a milling are affixed. On the plug-pins a further half-member with its sleeves is applied. The two half-members are then pushed against one another by force and are thereafter, because of the milling of the plug-pins pushed into the sleeves, joined together inseparably. Separation of the two half-members is unnecessary because the spring-power of the coupling-part does not fail even during long use.

I claim:

1. A chain-like plaything comprising a plurality of members and resilient coupling means including coupling parts joining said members end to end in pairs, each said member having at each end a plurality of flat surfaces inclined to one another whereby said end is of tapered form, said members being held together in areal contact of said surfaces resiliently by said coupling parts and having pivots engaged by said coupling parts, each coupling part comprising two annular members of stiff but resilient material embracing respective pivots of adjacent members of said plurality of members, and a coupling bar rigidly joining said two annular members, the resilience holding said members of said plurality of members in areal contact whereby said members are disposable selectively in areal content in a plurality of different stable positions.

2. A chain-like plaything comprising a plurality of members each of elongated octagonal shape and including two hollow half-members separated on a longitudinal plane and each half-member being of said elongated octagonal shape, the half-members being of plastic material and having therein corresponding sleeves containing sockets, and metal plug pins in the sockets holding the half-members together, with the axis of the sockets being substantially equidistant from the adjacent end and side surfaces of the member; and coupling means including at least one tensionally resilient coupling part pivotally connected to a pair of adjacent members to join said members, the members being resiliently held together in areal contact by the coupling part and being adapted to contact one another areally on their end and side surfaces in a plurality of digerent stable positions; the coupling part comprising two annular members joined rigidly by a flat coupling bar, each housed in a respective one of the joined members of the plurality of members and embracing respective sleeves of the joined members and pivotable about the sleeves, with the coupling part or parts being of a stiff but resilient plastics material.

References Cited

UNITED STATES PATENTS

| | | | |
|---|---|---|---|
| 434,302 | 8/1890 | Senner | 59—79 |
| 684,161 | 10/1901 | Zieher | 59—79 |
| 1,028,788 | 6/1912 | Rotherham | 59—79 |
| 2,558,228 | 6/1951 | Young | 16—183 |
| 2,576,439 | 11/1951 | Beck et al. | 57—79 |
| 2,751,634 | 6/1956 | Washington | 46—1 |
| 3,222,072 | 12/1965 | Dreyer | 273—157 |

FOREIGN PATENTS 440,268   12/1935   Great Britain.

F. BARRY SHAY, Primary Examiner

U.S. Cl. X.R.

16—183; 59—79; 160—229; 267—1; 273—155